Figures 1, 2, 3:
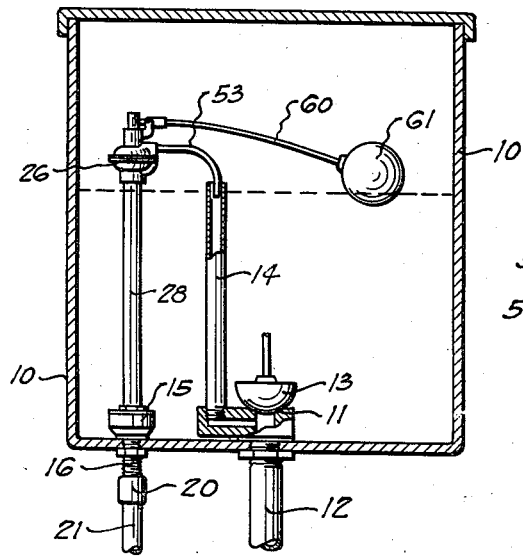

May 4, 1943.  A. C. LAYTON  2,318,236
VALVE
Filed Aug. 11, 1939    2 Sheets-Sheet 1

Inventor
Arthur C. Layton

By Jack A. Ashley
Attorney

May 4, 1943.　　A. C. LAYTON　　2,318,236
VALVE
Filed Aug. 11, 1939　　2 Sheets-Sheet 2

Inventor
Arthur C. Layton
By Jack A. Ehly
Attorney

Patented May 4, 1943

2,318,236

UNITED STATES PATENT OFFICE 2,318,236

VALVE

Arthur C. Layton, Tyler, Tex.

Application August 11, 1939, Serial No. 289,521

4 Claims. (Cl. 137—104)

This invention relates to new and useful improvements in valves.

One object of the invention is to provide an improved valve which is particularly adapted for use in flush tanks for water closets, the valve being arranged to be employed as a float actuated filling valve or as a time controlled flush valve.

An important object of the invention is to provide an improved valve wherein the control valve element is moved from fully closed to fully open position upon each operation, whereby a maximum volume of water may pass the valve element during the filling period, which makes for quicker filling of the tank and also permits a smaller flush tank to be employed; the arrangement also eliminating restricted flow orifices and passages, which are subject to wear by high velocity flow and thereby making the device efficient in operation under any pressure conditions.

Another object of the invention is to provide an improved filling valve for flush tanks which is so constructed that "back-siphon" from the flush tank to the supply line is prevented at all times, whereby it is impossible for the water to be drawn from the tank back into the supply line, either when the valve is closed or during the flushing or filling period.

Still another object of the invention is to provide an improved valve, of the character described, wherein the incoming water is unrestricted in its flow from the water supply line to the tank, and also wherein the valve element is cushioned or retarded in its movement toward a closed or seated position, whereby the valve is substantially noiseless and quiet in operation.

A still further object of the invention is to provide an improved float actuated valve for flush tanks having provision for introducing air into the device in the event a suction is created in the supply line, said air being introduced regardless of the position of the float, whereby a back flow of water from the tank to the supply line is positively prevented.

A particular object of the invention is to provide an improved valve, of the character described, wherein the working parts are located above the liquid level in the tank and no accumulation of sediment or water is possible; the construction being simple and comprising a minimum number of parts, which are readily disassembled for replacement, repair, or for other purposes.

Another object of the invention is to provide an improved valve, of the character described, having a pressure responsive member for controlling the main valve element, said member cooperating with a float actuated valve, whereby the water pressure is utilized to actuate the pressure responsive member to effect closing of the main valve element.

A construction designed to carry out the invention will be hereinafter described, together with other features of the invention.

Figures 4, 5:
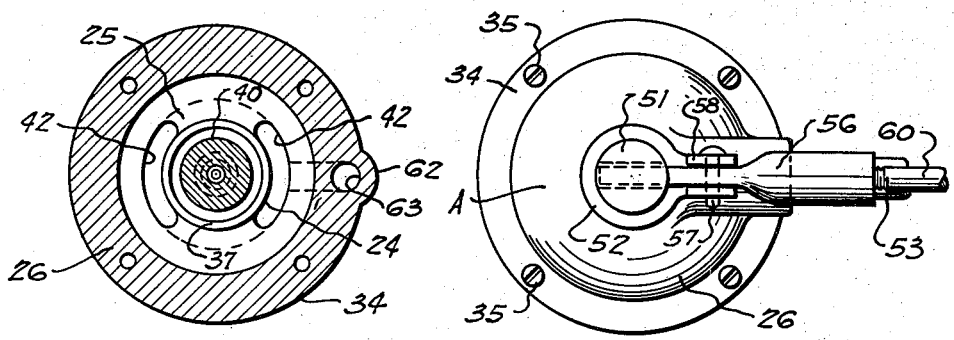
Figure 6:
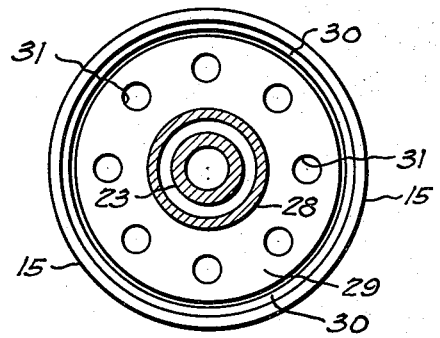
Figure 7:
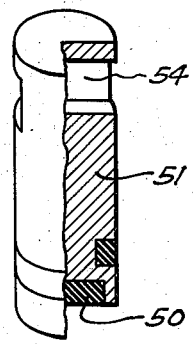
Figures 8, 9:
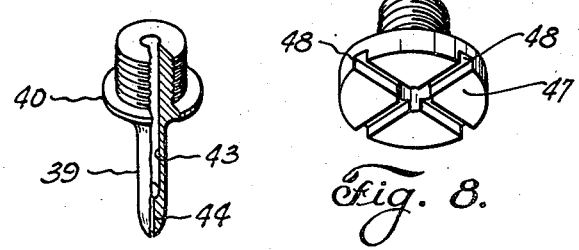

The invention will be more readily understood from a reading of the following specification and by reference to the accompanying drawings, in which an example of the invention is shown, and wherein:

Figure 1 is a view, partly in elevation and partly in section, and showing an improved valve mechanism, constructed in accordance with the invention, and mounted within the usual flush tank of a water closet, Figure 2 is a transverse, vertical, sectional view of the valve mechanism, Figure 3 is an enlarged transverse, vertical, sectional view of the upper portion of the valve mechanism and showing said valve in a closed position, Figure 4 is a plan view of the parts shown in Figure 2, Figure 5 is a horizontal, cross-sectional view, taken on the line 5—5 of Figure 2, Figure 6 is an enlarged, horizontal, cross-sectional view, taken on the line 6—6 of Figure 2, Figure 7 is a partial isometric view of the piston element which is actuated by the float, Figure 8 is an isometric view of the flanged nipple or collar which forms the upper valve seat, and Figure 9 is a partial isometric view of the pilot tube.

In the drawings, the numeral 10 designates the usual flush tank of a water closet (not shown). The tank is proivded with an outlet 11 which has a discharge pipe 12 leading therefrom and this pipe has connection with the usual bowl of the water closet. A suitable valve 13, which is ordinarily manually operated, closes the discharge opening 11 and, when this valve is lifted from its seat, the water within the tank 10 may discharge through the outlet pipe 12. An overflow pipe 14 is disposed within the tank and has its upper end normally disposed above the standing level within said tank. The lower end of the overflow 14 is connected in the discharge pipe 12 beyond the outlet opening 11 and valve 13, whereby water entering the upper end of said overflow may pass downwardly into the pipe 12, from which it is conducted to the bowl of the water closet. The pipe 14 provides, not only an overflow, but also an afterfill for the bowl, after the flushing period has been completed.

A cylindrical housing 15 is disposed within the lower end of the flush tank 10 and this housing has a depending nipple 16 which is preferably formed integral therewith. The nipple is disposed axially of the housing 15 and is threaded through an opening 17 formed in the bottom of the tank, the lower end of said nipple projecting from the tank bottom. A suitable gasket 18 may be interposed between the bottom of the housing and the bottom of the tank 10 and a lock nut 19, which screws onto the projecting end of the nipple, serves to tighten the housing against said gasket so as to provide a leak-proof seal around the nipple. The lower end of the nipple is connected by a suitable joint or coupling 20 to the water supply line 21, whereby water may flow upwardly through the nipple 16. The upper end of the bore of the nipple 16 is screw-threaded at 22 so as to receive the lower end of an elongate conductor or pipe 23, which pipe projects upwardly from the housing 15, as is clearly shown in Figure 2. The water entering the nipple 16 from the supply line 21 flows upwardly through the elongate conductor 23 to the upper end thereof, as will be hereinafter explained.

The upper end of the elongate conductor 23 is threaded into a collar 24, which collar is supported by a web 25 within a diaphragm case 26. The lower end of the diaphragm case is provided with an integral collar 27, which is of larger diameter than the collar 24. The collar 27 receives the upper end of an enlarged pipe 28, which surrounds the inner elongate conductor 23. The pipe 28 extends downwardly to the upper end of the housing 15 and has a circular plate 29 threaded thereon. As is clearly shown in Figure 2, the external diameter of the plate 29 is less than the internal diameter of the housing 15, whereby an annular flow passage 30 is formed between the periphery of the plate and the wall of the housing. It is preferable that the housing wall be bevelled so as to direct the flow outwardly therefrom. The circular plate 29 has a plurality of openings 31 therein (Figure 6) and, manifestly, these openings 31, together with the annular flow space 30, establish communication between the interior of the housing 15 and the interior of the flush tank 10.

For closing the openings 31 and the annular flow passage 30, a flexible valve disk 32, which may be constructed of leather, or other suitable material, surrounds the pipe 28 and overlies the plate 29 and the side walls of the housing 15. This disk 32 is held in position by means of a nut 33 which is threaded onto the pipe 28, such arrangement confining or clamping the disk between the plate 29 and the nut 33. When the flexible disk 32 is in the position shown dotted in Figure 2, said disk is closing the openings 31 and the passage 30, whereby a flow from the interior of the tank into the housing 15 cannot occur. Manifestly, the flexible disk 32 acts as a check valve which will permit a flow from the housing into the tank, but will prevent a flow in a reverse direction.

The diaphragm case 26 which is supported on the upper end of the elongate conductor 23 is constructed in two sections, including an upper section A and a lower section B. The sections are provided with annular flanges 34, which are adapted to be bolted together by bolts 35. The interior of the casing 26 above the collar 24 forms a diaphragm chamber and a circular diaphragm or disk 36 is disposed within this chamber. The peripheral edge portion of the flexible diaphragm 36 is clamped between the flanges 34 of the sections A and B of the case. Manifestly, the diaphragm is adapted to flex or move vertically within the interior of the case above the collar 24.

The upper end of the collar 24 is disposed in a plane above the top of the transverse spider or support 25, whereby this upper end forms an annular valve seat 37. This seat is adapted to be engaged by a resilient valve element or collar 38 which is secured to the underside of the diaphragm 36. The valve element 38 is preferably constructed of rubber, or other flexible material, and is fastened to the diaphragm by means of a pilot tube 39. The tube 39 extends axially within the upper portion of the inlet conductor 23 and is formed with a flange 40 which engages the underside of the valve element. The upper end of the tube 39 extends through an axial opening in the diaphragm 36 and has a retaining nut 41 threaded onto the upper end thereof. With this arrangement, it will be manifest that the flexible or resilient valve element 38 is confined between the flange 40 on the tube 39 and the diaphragm 36, being held and confined therebetween by means of the retaining nut 41 which holds the flange in engagement with the underside of said element. When the diaphragm is in the position shown in Figure 2, the valve element 38 is spaced from the upper end of the valve seat 37, whereby water from the inlet conductor 23 may flow into the diaphragm chamber below said diaphragm. From this chamber, the water may flow downwardly through a pair of arcuate slots 42, which are formed diametrically opposite each other in the transverse spider or support 25 (Figure 5). After passing through the ports 42, the water passes downwardly through the outside pipe 28, flowing through the annular space formed between the bore of this pipe and the exterior of the inlet conductor 23. The water passes into the interior of the housing or chamber 15 and then escapes upwardly through the ports or openings 31 and the flow passage 30. The pressure of the water is sufficient to lift the flexible disk 32 to permit a flow through the openings and through the pasage. When the diaphragm 36 is in the position shown in Figure 3, the flexible valve element 38 has moved downwardly into engagement with the valve seat 37, whereby a flow from the upper end of the conductor is prevented.

The velocity tube 39 which depends axially within the upper portion of the inlet conductor 23 has an axial bore 43. The lower end of this bore is reduced to form a restricted opening 44 and, obviously, water from the conductor 23 may flow upwardly through the restriction and then through the bore 43 into the chamber above the diaphragm 36. The upper end or top of the diaphragm case is formed with a laterally directed passage 45, which extends from the outer periphery of the case inwardly to the central portion thereof. The inner end of this passage communicates through an opening 46 with the chamber above the diaphragm 36. A flanged collar 47 is threaded into the opening 46 and the underside of this collar is provided with radial grooves or recesses 48, as is clearly shown in Figure 8. The upper end of the collar 47 projects into the passage 45 and this upper end forms an annular valve seat 49.

The valve seat 49 is arranged to be engaged by a flexible valve disk 50, which is embedded in the lower end of a piston 51, which piston is slidable within a cylinder 52 which extends upwardly from the diaphragm case and which is preferably made integral therewith. When the piston 51 is in the position shown in Figure 2, the flexible disk 50 thereof is spaced from the valve seat 49, whereby communication between the radial passage 45 and the interior of the diaphragm case above the diaphragm 36 is established. However, when the piston is lowered, as shown in Figure 3, the disk 50 engages the valve seat 49 to prevent a flow from the passage to the case and vice versa. The outer end of the lateral passage 45 has one end of a tube 53 connected thereto. The outer end of the tube is curved downwardly and is engaged within the upper end of the overflow pipe 14 which is located within the flush tank 10.

For controlling the movement of the piston 51 so as to control the seating and unseating of the valve disk 50, the upper end of said piston is formed with a diametrically extending slot 54. A lever 56 is pivoted on a pin 57, which pin is mounted within upwardly extending ears 58, the latter being formed integral with the cylinder 52. The inner end of the lever has a circular portion 59 which is disposed within the diametrically extending slot 54. Manifestly, when the lever is swung on its pivot 57, the piston 51 is raised or lowered in accordance with the swinging movement of said lever. The outer end of the lever has a float arm 60 threaded thereinto and the outer end of said arm carries a suitable float ball 61. The position of the ball 61 is, of course, controlled by the level of the water within the flush tank 10 and, as said level varies, the arm 60 is moved to swing the lever 56, whereby the piston is raised or lowered. When the proper level is standing within the flush tank 10, the ball is raised and the piston is in the position shown in Figure 3, with the valve disk 50 engaging its seat 49. However, when the water level within the tank 10 falls, the float 61 is lowered to cause a lifting or raising of the piston 51 and an unseating of the valve disk 50.

The diaphragm case 26 is formed with a boss 62 at one side thereof and this boss is provided with a by-pass port 63, which is clearly shown in Figures 2 and 3. The upper end of the port or passage 63 communicates with the lateral passage 45, while the lower end of the passage 63 communicates with one of the arcuate slots 42 in the transverse spider or support 25. The by-pass 63 permits water, which is flowing downwardly through the outer pipe 28, to flow into the tube 53 and from said tube into the overflow pipe 14 of the tank, whereby water is conducted to the bowl to replace water in the closet bowl trap, which has been removed by siphonage when the closet was flushed.

In operation, assuming the parts to be in the position shown in Figure 2, with the water level in the tank 10 lowered, the float 61 is lowered, whereby the piston 51 is raised. In such position, the valve disk 50 of the piston is unseated and spaced from the valve seat 49. The diaphragm 36 is in an intermediate position, whereby the flexible valve element 38 is also unseated. At this time, water from the supply line 21 flows upwardly through the nipple and through the inlet conductor 23. From the upper end of the conductor, the water enters the diaphragm chamber below the diaphragm 36 and then flows downwardly through the arcuate ports or slots 42, through the pipe 28 and into the housing 15. This water within the housing unseats the flexible valve disk 32 and flows into the interior of the tank 10. The main supply of water to the tank is in this manner.

At the same time, a certain amount of water is flowing through the by-pass passage 63 and into the curved outlet tube 53. From said tube, the water flows downwardly through the overflow pipe and then to the closet bowl to replace the water which has been removed therefrom by siphonage when the closet was flushed. Also, water is flowing upwardly through the restricted bore 44 of the pilot tube, then upwardly through the bore 43 and into the chamber above the diaphragm 36. Since the valve 50 is unseated, the water from the chamber above the diaphragm 36 may enter the lateral passage 45 and pass outwardly through the tube 53 with the water which is entering said tube from the passage 63.

As the water rises within the flush tank 10, the float 61 rises therewith until said float causes the piston 51 to be lowered sufficiently to engage the flexible valve disk 50 with the valve seat 49. When this occurs, the flow of water from the chamber above the diaphragm 36 is shut off, with the result that a pressure is built up above the diaphragm. The effective area, which is being acted upon by the water pressure flowing upwardly through the inlet conductor 23, is much less than the upper area or surface of the diaphragm 36 and, therefore, when the pressure in the chamber above said diaphragm builds up to a predetermined point, the diaphragm is moved downwardly whereby the flexible valve element 38, which is carried by the underside of said diaphragm, is engaged with the valve seat 37. When this occurs, further flow of the water from the inlet conductor 23, through the pipe 28 and housing 15 and to the tank, is shut off. The halting of the flow of water through the housing 15 causes the water within the tank 10 to act against the flexible disk 32, whereby said disk is moved to the position shown dotted in Figure 2. In such position, a backflow of water from the tank into the housing cannot occur.

When the closet is flushed and the water released from the flush tank 10, the float 61 descends, thereby lifting the piston 51 and raising the valve disk 50 from its seat 49. This permits the water within the chamber above the diaphragm 36 to escape through the passage 45. Of course, water from the conductor 23 may continue to enter the chamber above the diaphragm through the pilot tube 39, but due to the relatively small size of the restricted opening 44, the water may escape from the chamber above the diaphragm faster than additional water can enter said chamber. Therefore, the pressure above the diaphragm is reduced and the pressure of the water within the inlet conductor 23 is sufficient to lift the diaphragm, whereby the flexible valve element 38 is raised off of its seat 37. Upon the raising of the valve element 38, the flow of water from the conductor 23 into the pipe 28 again occurs. In the event that the diaphragm is lifted sufficiently to cause the retaining nut 41 to strike the flanged collar 47, the radial recesses or grooves 48 in said collar permit a flow into the chamber above the diaphragm to continue. The parts remain in this position until the float 61 is again raised to lower the piston 51 at which time the valve 50 is again seated to permit a pressure to be built up above the diaphragm 36 to lower said diaphragm and again seat the valve element 38.

It may sometimes occur that when the tank 10 is standing with the proper water level therein, a vacuum will be produced in the water supply line 21. Such vacuum may be caused from various reasons, as for example, if the water supply is cut off from the system and drained, and in the event that such a vacuum does occur, a similar vaccum occurs in the inlet conductor 23. A similar vacuum will, of course, be produced in the chamber above the diaphragm 36, such vacuum acting through the bore 43 and restricted opening 44 of the pilot tube 39. This vacuum will cause the diaphragm 36 to lift off of its seat 37 and as soon as this occurs, the vacuum acts through the by-pass passage 63 and through the tube 53. This vacuum pulls air in through the tube and through the passage and into the inlet conductor 23 to destroy the vacuum in said conductor. In the event that the vacuum increases faster than it can be destroyed by this incoming air, the water which will be standing within the pipe 28 will begin to rise, whereupon the valve disk 32 will be drawn into tighter engagement with the plate 29 and housing 15, thus preventing any further passage of water upwardly through the pipe 28. It is noted that the pressure may vary from one side of the diaphragm 36 to the other but air will continue to enter through the tube 53 and passage 63 until the vacuum is completely destroyed. There is no possibility of water being withdrawn from the flush tank and back into the supply line by the creation of a vacuum into said line.

In some instances, the vacuum in the supply line 21 and inlet conductor 23 may occur during the flushing period, in which event the parts would be in the position shown in Figure 2. In case a vacuum occurs at this time, the air which is being pulled through the tube 53 will also enter the lateral passage 45, as well as the by-pass 63. The air from the passage 45 flows through the collar 47 and into the chamber above the diaphragm 36, whereby the pressure is thereby equalized on each side of said diaphragm. Since the valve seat 37 has a larger area than the by-pass 63 and the port or restriction 44 in the pilot tube 39, it follows that the pressure will be reduced below the diaphragm 36, whereby said diaphragm will move downwardly and seat the valve element 38 on its seat 37. The diaphragm will remain in its lowered position and the valve 38 will remain seated until the vacuum is completely destroyed by the air which continues to flow through the lateral passage 45, chamber above the diaphragm 36 and through the pilot tube 39 into the inlet conductor 23. Therefore, if the vacuum in the supply line 21 occurs when the valve is unseated, it will be manifest that the arrangement of parts provides for the admission of air to permit seating of the valve 38 to shut off any possible backflow.

It is pointed out that the incoming water from the inlet conductor 23 reaches its highest velocity at the restriction 44 of the pilot tube 39. After it passes the restriction, it flows through the larger bore 43 of said tube and its velocity is materially reduced. Also, the water passing around the tube 39 flows past the valve seat and into the relatively larger area of the pipe 28. From the pipe, the water then enters the chamber 15 which is considerably larger than the pipe 28. Therefore, in its flow, there is no restriction of the water and no high velocity is created in the system. It is pointed out that, by conducting the water downwardly through the tube, the device is substantially noiseless in its operation. The resistance of the flexible valve disk 32 prevents a quick opening of the ports 31 and the channel 30, with the result that the pipe 28 will stand practically full of water at all times as the tank is filling.

The water pressure in the conductor 23 below the valve element 38 remains substantially constant so long as the valve is seated. When the pressure above the diaphragm 36 falls below the pressure acting against the underside of the valve 38, the diaphragm will be moved upwardly to unseat the valve to its full open position. Similarly, with the valve in an open position and the diaphragm raised, as soon as the pressure above said diaphragm 36 exceeds the pressure acting against the underside thereof, the valve will be moved to a fully closed position. It is pointed out, however, that the diaphragm does not move to its lowered position as quickly as it moves to its raised position. This is true because, as the diaphragm descends, the pressure below it increases at a faster rate than the total pressure above the diaphragm increases. This arrangement will bring about a cushioning effect which results in a soft, as well as a quick, closing of the valve. This eliminates the snap which is present in some flush valves and which is highly objectionable. Since the piston 51 and the port through the collar 47 control only a relatively small amount of water, as compared to the main supply in the tank 10, it follows that only a small opening is necessary and compound leverage of the actuating mechanism and lever 56 is unnecessary. This makes it possible to efficiently operate the valve at either extremely low pressure or extremely high pressure.

The construction of the device is very simple and a minimum number of parts is employed. In order to replace or repair any of the parts within the diaphragm case, it is only necessary to remove the bolts 35, after which the upper section of the diaphragm, together with its associate parts, may be lifted off of the lower section. This exposes the diaphragm which may be readily repaired or replaced. The diaphragm is located so as to operate above the normal water level within the tank 10 and, manifestly, there are no pockets or recesses in which water or sediment may collect, which might interfere with the operation of the device.

The piston 51 has been illustrated as controlled by the float 61, but it is pointed out that if desired a timing device may be associated with said piston, whereby the valve would be converted into a flush valve for water closets. It is also pointed out that, although the pilot tube 39 is desirable, said tube could be eliminated and a relatively small port provided through the diaphragm, whereby communication between the inlet conductor 23 and the chamber above said diaphragm would be established through such port.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. A valve mechanism for a flush tank including, an elongate liquid inlet conductor extending into the tank, a valve body mounted on the upper end of the conductor and communicating therewith, an enlarged conduit surrounding the conductor and having its upper end communicating with the interior of the valve body whereby the liquid may flow from the conductor to the conduit, a valve element movable within the body for controlling the flow from the conductor to the conduit, a receiving housing at the lower end of the conduit and having communication with the interior of the tank, and a check valve for permitting flow from the housing to the tank and for preventing backflow from the tank to the housing.

2. A valve mechanism for a flush tank including, an elongate liquid inlet conductor extending into the tank, a valve body mounted on the upper end of the conductor and communicating therewith, an enlarged conduit surrounding the conductor and having its upper end communicating with the interior of the valve body whereby the liquid may flow from the conductor to the conduit, a valve element movable within the body for controlling the flow from the conductor to the conduit, a receiving housing at the lower end of the conduit and having communication with the interior of the tank, and flexible means for permitting flow from the housing to the tank and for preventing backflow from the tank to the housing.

3. A valve mechanism for a flush tank including, an elongate liquid inlet conductor extending into the tank, a valve body mounted on the upper end of the conductor and communicating therewith, a liquid outlet conduit having its upper end communicating with the interior of the valve body and its lower end communicating with the interior of the tank whereby the liquid may flow from said conductor to the conduit and into the tank, a valve element movable within said body for controlling the flow from the conductor to said conduit, a pressure-responsive member connected to the valve element for moving said element to open and closed positions, means for conducting a portion of the liquid flowing through the valve body to the upper side of the pressure-responsive member, auxiliary valve means for controlling the escape of said liquid from above said member, whereby the liquid may be trapped above the member to build up a pressure sufficient to actuate said element and move the valve element to a closed position, a by-pass line leading from the valve body for conducting a portion of the liquid from said body when said valve element is open, said by-pass serving to admit air to the valve body in the event a vacuum is created in said body, whereby such vacuum is destroyed and backflow of liquid through the mechanism is prevented, and means at the lower end of the conduit for permitting flow from said conduit to the tank and for preventing backflow from said tank to the conduit.

4. A valve mechanism for a flush tank including, an elongate liquid inlet conductor extending into the tank, a valve body mounted on the upper end of the conductor and communicating therewith, a liquid outlet conduit having its upper end communicating with the interior of the valve body and its lower end communicating with the interior of the tank whereby the liquid may flow from said conductor to the conduit, and into the tank, a valve element movable within said body for controlling the flow from the conductor to said conduit, a pressure-responsive member connected to the valve element for moving said element to open and closed positions, means for conducting a portion of the liquid flowing through the valve body to the upper side of the pressure-responsive member, auxiliary valve means for controlling the escape of said liquid from above said member, whereby the liquid may be trapped above the member to build up a pressure sufficient to actuate said element to a closed position, a by-pass line leading from the valve body for conducting a portion of the liquid from said body when said valve element is open, a passage leading from the upper side of the pressure-responsive member and communicating with the by-pass line for conducting the liquid above said member to the by-pass when the auxiliary valve means is open, said by-pass and passage serving to admit air to the valve body in the event a vacuum is created in said body, whereby such vacuum is destroyed and backflow of liquid through the mechanism is prevented, and means at the lower end of the conduit for permitting flow from said conduit to the tank and for preventing backflow from said tank to the conduit.

ARTHUR C. LAYTON.